G. W. HARTLEY & A. W. SEELEY.
EGG CARRIER.
APPLICATION FILED DEC. 23, 1915.
1,223,872.
Patented Apr. 24, 1917.
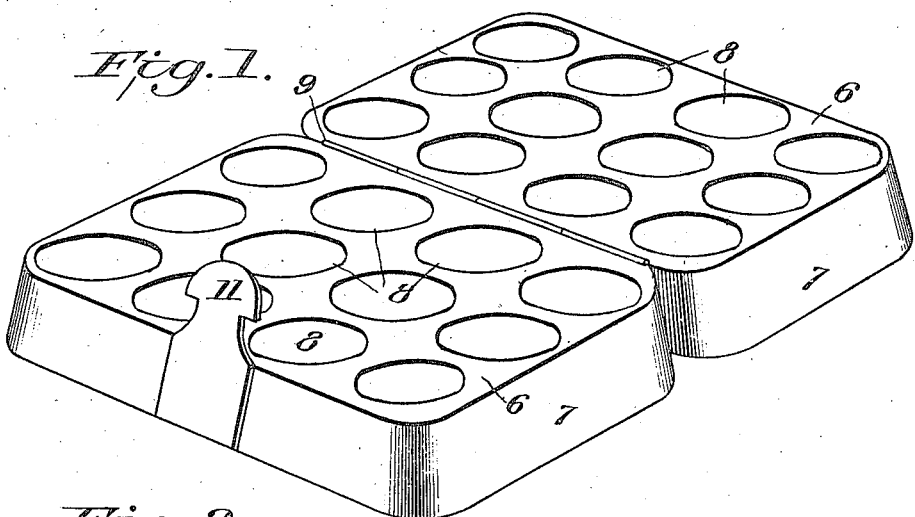
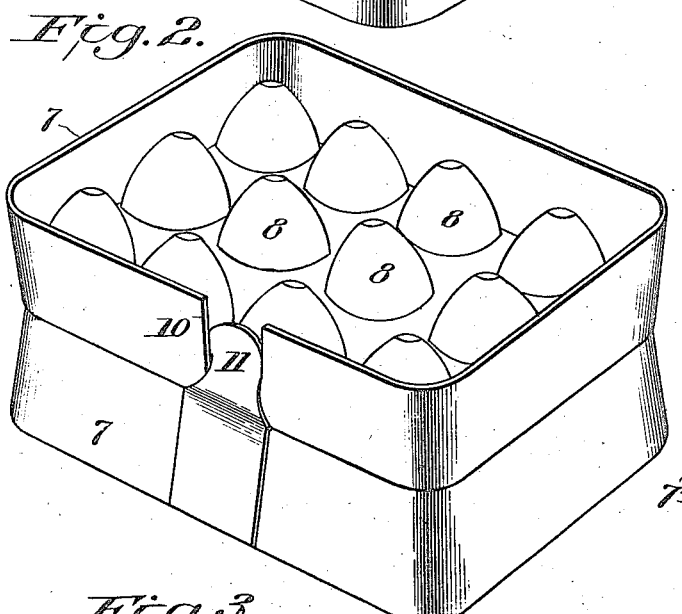
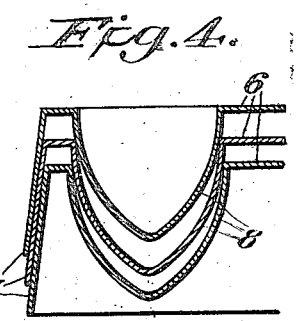
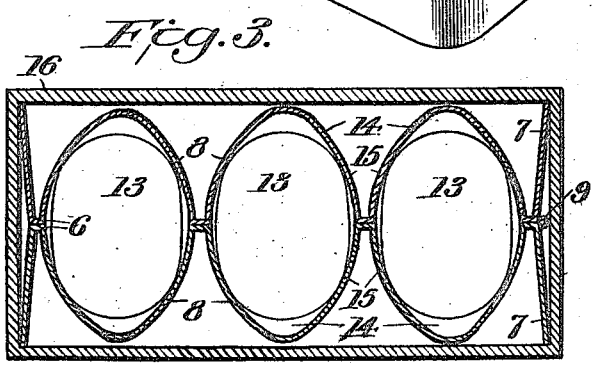
Inventor
Geo. W. Hartley
Arthur W. Seeley
by Geo. E. Tew
Attorney

UNITED STATES PATENT OFFICE.

GEORGE W. HARTLEY AND ARTHUR W. SEELEY, OF SAGINAW, MICHIGAN.

EGG-CARRIER.

1,223,872.   Specification of Letters Patent.   Patented Apr. 24, 1917.

Application filed December 23, 1915. Serial No. 68,355.

*To all whom it may concern:*

Be it known that we, GEORGE W. HARTLEY and ARTHUR W. SEELEY, citizens of the United States, residing at Saginaw, in the county of Saginaw and State of Michigan, have invented certain new and useful Improvements in Egg-Carriers, of which the following is a specification.

This invention relates to containers or carriers for eggs or similar fragile articles, and has for its object to provide an improved device particularly adapted and intended for the transportation or delivery of eggs or the like.

The improvement relates particularly to a filler or cell case in which the eggs are contained, the filler comprising two parts or halves which fit together, each part containing a plurality of cells or half cells, molded in one piece, the cells having the form of half pockets or recesses, which when the two parts are placed together join to produce complete cells for holding eggs or the like.

An important feature of the device is that the filler is provided ready for use, and does not have to be set up or assembled as with fillers consisting of interlocking strips. The filler is preferably made of paper or wood pulp, molded, stamped or pressed to the desired shape, thereby producing a comparatively strong and rigid container in which eggs are individually held without danger of breaking, or, should one be broken, it is retained within the particular cell and will not run out over the others.

The shape of the cells is such that a yielding or cushion pressure or effect is obtained on the eggs therein, whether the eggs are large or small, the flexibility of the material permitting the cells to accommodate themselves to the various sizes and shapes of eggs placed therein.

A further advantage of the structure is that the fillers can be nested for storage or transportation, since the back or rear side of one will fit upon or into the front of another, whereby they may be nested and piled in comparatively small space.

The two halves or sections of the filler are provided with an improved latching device for holding the same closed upon eggs therein, this latching device being also made of paper or the like.

For ordinary store delivery purposes the filler or container alone may be used, but for shipment by mail or express the filler will preferably be placed in suitable boxes or cases to protect the same from rough handling.

Further advantages will be apparent from the following description and the accompanying drawings.

In the drawings, Figure 1 is a perspective view of the filler in open position. Fig. 2 is a similar view in closed position. Fig. 3 is a vertical section, showing the filler within an outer box or casing. Fig. 4 is a sectional view illustrating the manner of nesting the fillers.

The filler may be made of any desired material or size, but as stated is preferably pressed or molded from paper, wood pulp, or the like. It is made in two parts or halves, and each part comprises a face plate 6, around the edge of which is a flared skirt or flange 7, and the plate supports or contains a plurality of half pockets or cells 8, the form of which will depend on the nature of the articles to be carried. The plate, the flange, and the cells may all be pressed or formed from a single sheet of paper or the like, or molded from pulp in one piece. The depth of the flange 7 is somewhat greater than that of the cells 8, so that said cells are slightly within the plane of the edge of the flange. Two of these trays or parts are united with the face plates 6 in contact, to form a complete filler, the half cells 8 registering to produce the complete cells. The two sections may if desired be hinged at one edge as indicated at 9, so that the top or upper part will swing to open or closed position. At the side opposite to the hinge, the flange of one part is provided with a notch 10, and the flange of the other part is provided with a latch 11 having a head which may be bent or pressed into the notch to catch the shoulders 12 against the corners of the notch, and so hold the two halves in closed position. This latch can be cut out of paper and glued to the outer face of the flange.

For carrying eggs the complete cells 8 will have the shape of an elongated oval, somewhat longer than the longest axis of an egg, and slightly narrower at the sides than the corresponding diameters of the egg, so that when the eggs 13 are placed therein spaces 14 will be left between the ends of the eggs and the ends of the cells, but the sides of the cells will contact with a yielding pressure against the sides of the eggs, as indicated at 15, the cells yielding enough to accommodate themselves to eggs of various sizes. Inasmuch as the widths of eggs do not differ much, however their lengths may differ, the elongated shape of the cells and the pressure of the sides thereof against the sides of the eggs, will cause all kinds of eggs to be firmly held or gripped, without such looseness as would result from rigid or oversized cells, or from contact at the ends of the eggs only, the engagement preventing any movement of the eggs in any direction. The projecting flanges 7 give rigidity to the plates 6, and also serve to support the filler or container on any surface upon which it may be placed, without any contact or shock of the cells with or against such surfaces.

The container is always in condition for placing eggs therein directly without delay of setting up loose parts, and will preferably be made in sizes each containing a stated number of cells, so that counting is unnecessary.

For ordinary delivery purposes, the eggs can be carried in the container, without further wrapping, but for mail or express transportation the filler will preferably be placed in a casing or box of suitable size to hold the same snugly, such box being indicated at 16 in Fig. 3. This may conveniently be a corrugated paper board carton, although any suitable container will serve. When placed in such a box, the edges of the flanges 7 will rest against sides and top and bottom of the box, and so stiffen and strengthen the same, and prevent any looseness or shift of the filler therein.

Fig. 4 illustrates the manner in which the container sections may be nested. The flanges 7 fit one within the other, because they are slightly spread, and the cells of one part or section fit within the cells of another when they are faced the same way and stacked, the hinged sections being first opened to flat position before they are stacked.

The invention is not limited to the exact form shown, nor to the special material mentioned, but various changes may be made within the scope of the following claim.

What we claim is:

A cell case comprising an outer casing, and a filler therein comprising two plates faced together in contact, said plates each having half cells which are registered to form complete cells, and also having outwardly flared marginal flanges of greater width than the depth of the cells, said flanges projecting on the same sides of the plates as the cells and fitting at their edges into the corners of the casing.

In testimony whereof, we affix our signatures in presence of two witnesses.

GEORGE W. HARTLEY.
ARTHUR W. SEELEY.

Witnesses:
MAMIE L. JOHNSON,
GERTRUDE M. ROSSMAN.